Jan. 1, 1935. G. C. COIL 1,986,184
ELECTRICALLY OPERATED REGISTER
Filed June 23, 1930 7 Sheets-Sheet 1

INVENTOR
Grover C. Coil
BY Hastings W. Baker
ATTORNEY

Jan. 1, 1935.  G. C. COIL  1,986,184
ELECTRICALLY OPERATED REGISTER
Filed June 23, 1930  7 Sheets-Sheet 3

INVENTOR
Grover C. Coil
BY Hastings W. Baker
ATTORNEY

Jan. 1, 1935.  G. C. COIL  1,986,184
ELECTRICALLY OPERATED REGISTER
Filed June 23, 1930  7 Sheets-Sheet 4

INVENTOR
Grover C. Coil
BY Hastings W. Baker
ATTORNEY

Jan. 1, 1935. G. C. COIL 1,986,184
ELECTRICALLY OPERATED REGISTER
Filed June 23, 1930 7 Sheets-Sheet 7

INVENTOR
Grover C. Coil
Hastings W. Baker
ATTORNEY

Patented Jan. 1, 1935

1,986,184

UNITED STATES PATENT OFFICE 1,986,184

ELECTRICALLY OPERATED REGISTER

Grover Cleveland Coil, Dayton, Ohio, assignor, by mesne assignments, to Central United National Bank, Cleveland, Ohio, as trustee Application June 23, 1930, Serial No. 462,978

9 Claims. (Cl. 235—45)

The object of this invention is to make an electrically operated register which may be used in connection with registers for use on street cars, cash registers or wherever a registering machine may be used. Another object of this invention is to provide a register which may be operated at a distance from the operator. For the purpose of illustration, I have shown the same as applied to that type of register shown in the patent of John F. Ohmer and C. W. Ketteman, 905,218, patented December 1, 1908, to which patent reference may be made as to the construction of the register per se.

The invention pertains to an operating means for a register whereby an operating box may be placed at any convenient location, which operating box is provided with a plurality of keys. I have shown only three such keys denoting Cash, Transfer, and Ticket, but there might be any number of keys such as the keys shown on a conventional key board of a cash register. These keys control means whereby the proper element in the register is selected and the register is operated to register and to record the transaction. It is so constructed that if the operator should continue to hold down the key, the electric current which operates the register would be automatically cut off after the machine had been operated. Means are also provided whereby two keys cannot be depressed.

Should the current go off before the operation is completed, the operating mechanism would stop at the very instant the current stopped and when the current comes back on, the operating mechanism would immediately complete the operation.

Figures 11, 12, 13:
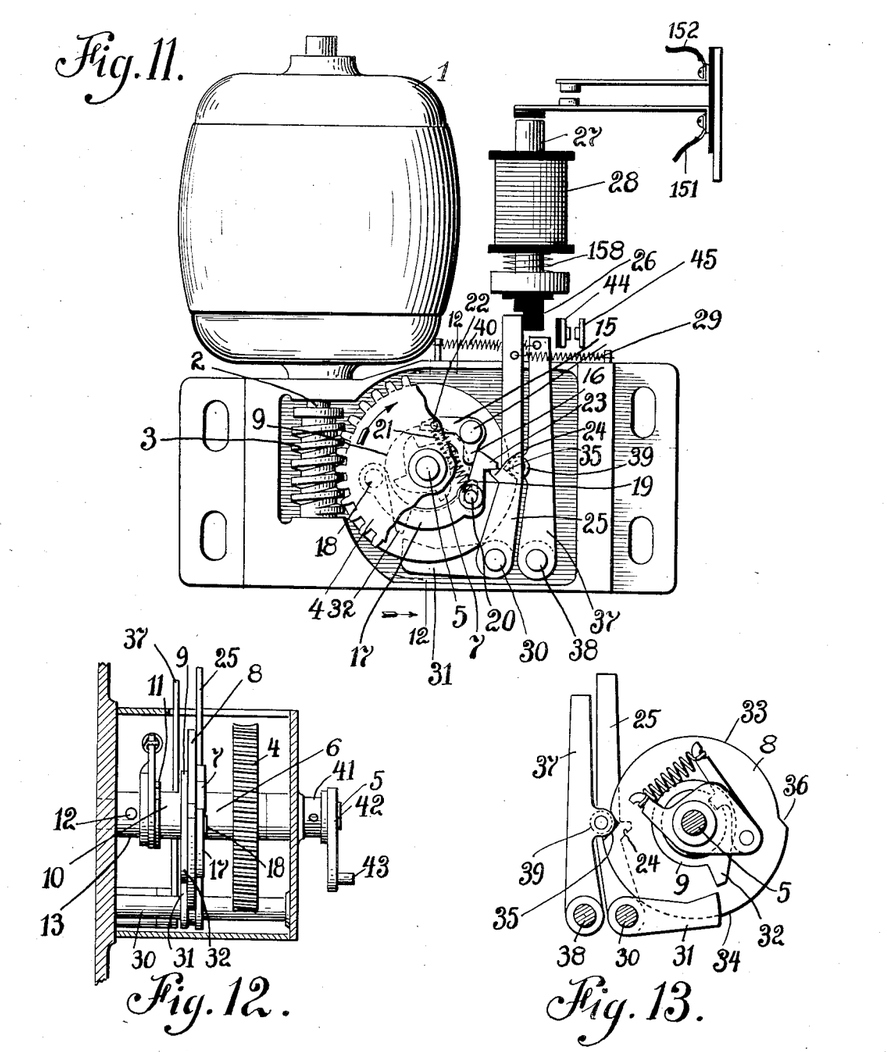
Figure 11 is a front view of the driving means for the register and one of the solenoids.
Figure 12 is a view on the line 12—12 of Figure 11.
Figure 13 is a view of the cam and associated mechanism forming a part of the control for the motor.

The motor is of the familiar type shown in the patent of Albert S. Wheelbarger, Number 1,851,267, issued March 29, 1932, in which an electric motor 1 drives a shaft 2 which carries a worm 3, which meshes with and drives a worm gear 4, which is loosely mounted on a shaft 5, which gear 4 is provided with a sleeve 6 which has secured thereto a ratchet 7. The gear 4, sleeve 6, and ratchet 7 move as a unit and as they are loosely mounted on the shaft 5 they do not directly impart the rotation given by the motor to the shaft 5. The disk 8, cam disk 9, collar 10 and safety disk 11 are all secured together and are secured to the shaft 5 by means of a pin 12 which passes through an extension 13 of the collar 10 and the shaft 5, so that all of these parts move as a unit with the shaft 5. A pin 14 is mounted on the disk 8 and on this pin is pivoted a dog 15 provided with an extension 16 which is engaged by one end of a lever 17 pivoted on a pin 18 mounted on the said disk 8. The lever 17 is provided with a slot 19 which receives a pin 20 carried by the said disk 8. A spring 21 connects the said pin 20 to a pin 22 carried by the dog 15, which spring tends to rotate the dog 15 anti-clockwise, as shown in Figure 11, to move the right hand end of the lever 17 outwardly and downwardly so that the nose 23 on the lever 17 will be engaged by a nose 24 carried by the lever 25. The upper end of the lever 25 is normally pulled against an extension 26 of the core 27 of the solenoid 28 by means of a spring 29. The lever 25 is pivoted on a shaft 30 and is provided with an offset extension 31 which lies in the plane of the cam disk 9 which is provided with a cam 32. This disk 8 is bounded by semi-circumferential lines 33 and 34, the radius of the semi-circumference 33 being less than the radius of the semi-circumference 34. At one end of the semi-circumference is a V shaped notch 35. The other ends of the semi-circumferences 33 and 34 are connected by a cam surface 36. The lever 37 is pivoted on a shaft 38 and carries a roller 39 which rolls on the periphery of the disk 8, being pulled towards the same by means of a spring 40. The shaft 5 has secured thereto a collar 41 to which is secured a crank arm 42 which carries a crank pin 43.

When the solenoid 28 is energized, the core 27 moves upwardly so that the extension 26 is above the upper end of the lever 25 and the spring pulls the upper end of the said lever towards the right as viewed in Figure 11, so that the nose 24 on the lever 25 is removed from engagement with the nose 23 on the lever 17. The spring 21 then rocks the dog 15 anti-clockwise as viewed in Figure 11, so as to engage the ratchet 7. As the worm gear 4 is being driven by the worm 3 which is in turn driven by the motor, the ratchet 7 will now impart its rotation to the disk 8, which is secured to cam disk 9 and shaft 5 thereby rotating the said shaft 5 which in turn rotates the crank 42. During the first half revolution of the disk 8, the roller 39 has been rolling on the semi-circumference 33, but at the end of the first half revolution of the said disk the cam surface 36 engages the said roller and moves the lever 37 to the right as viewed in Figure 11, so that the upper end thereof engages the spring contact 44 and moves it into contact with the spring contact 45. The roller 39 now rolls on the semi-circumference 34 until it reaches the notch 35 which is the home position. When it reaches this position, the disk 8 is stopped by means of the cam 32 on the disk 9 engaging the extension 31 of the lever 25 moving the said lever so that the nose 24 is in the path of movement of the nose 23 on the lever 17 which presses on the extension 16 of the dog 15 thereby disengaging the said dog from the ratchet 7 so that the motor can continue to operate as long as power is supplied thereto but this rotation is not imparted to shaft 5 or crank arm 42.

Figure 1:
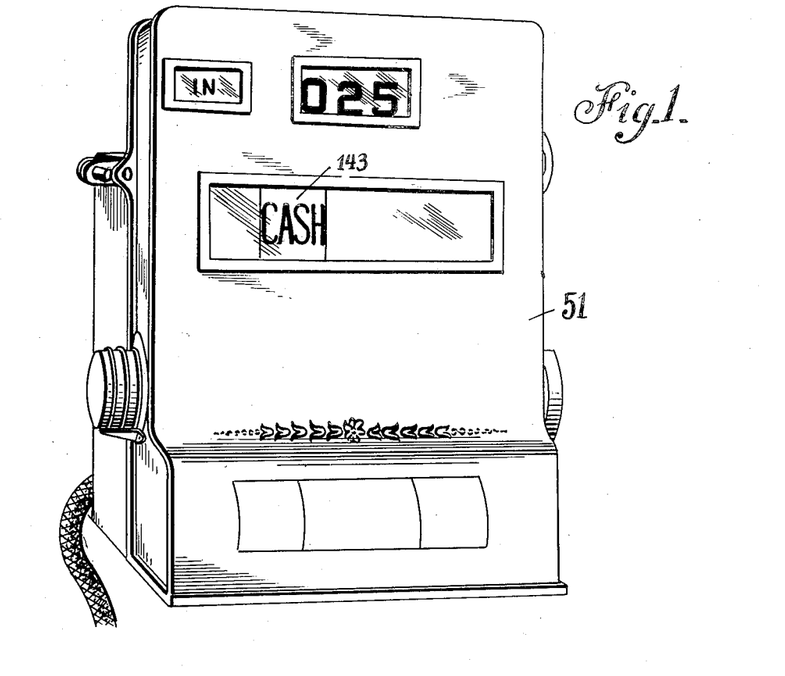
Figure 1 is a front elevational view of the register.
Figure 2:
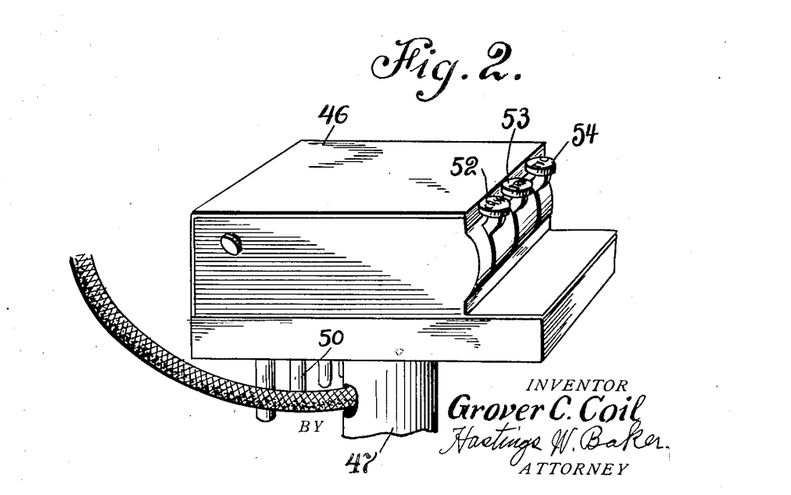
Figure 2 is an elevational view of the operating box.
Figure 3:
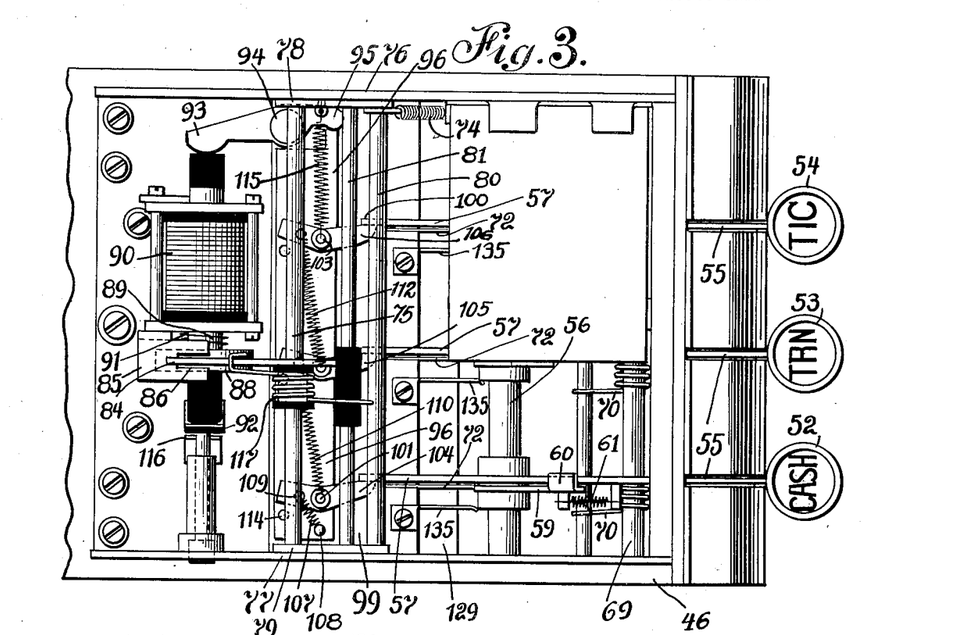
Figure 3 is a top plan view of the operating box with the cover removed.
Figure 4:
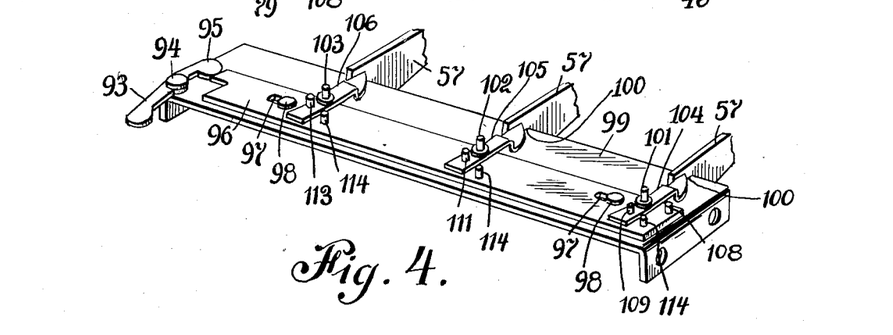
Figure 4 is a perspective view of the locking mechanism of the keys.

The operating box 46 is adapted to be removably attached to a pedestal 47 which carries a base 48 provided with spring contacts 49 which engage electric plugs 50 carried by the operating box 46. If, for instance, the device is to be used as a street car register, the register 51 may be mounted at a fixed place in the street car. By having a pedestal 47 at both the front and the back end of the street car, the operating box may be picked up and carried from one of the pedestals to the other and placed thereon so that the plugs 50 engage the spring contacts 49.

Figure 8:
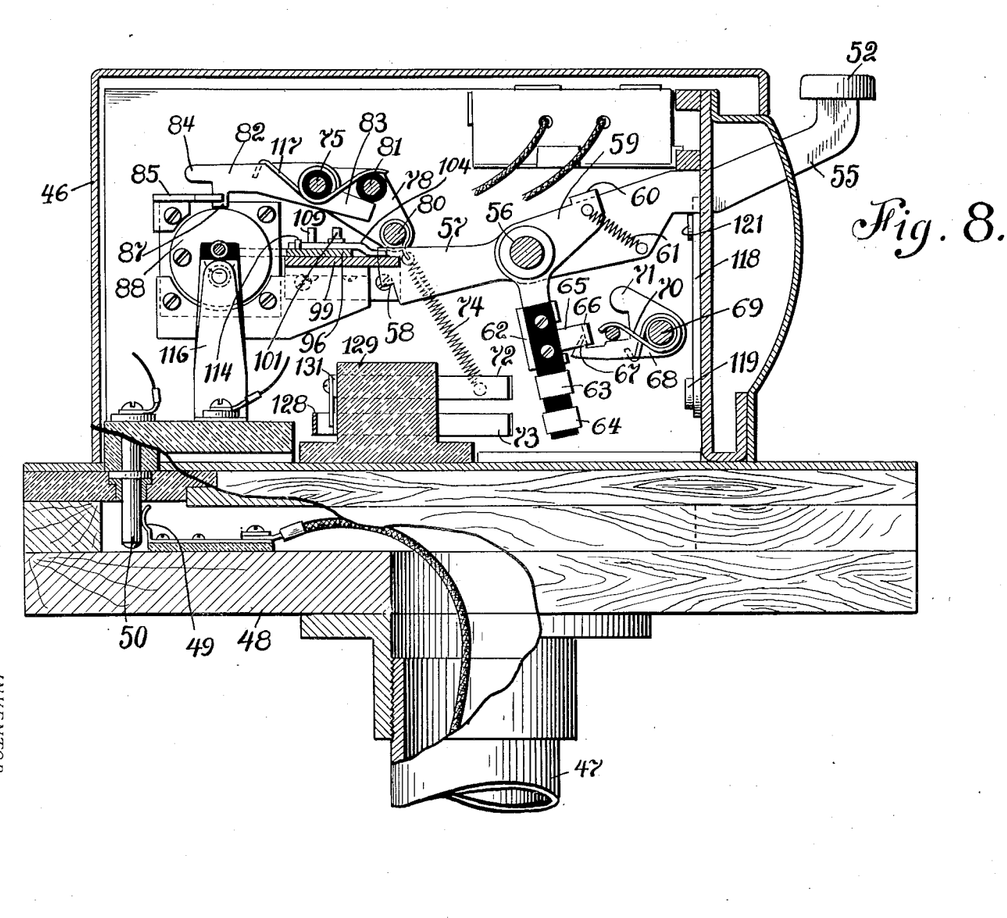
Figure 8 is a cross sectional view on the line 9—9 of Figure 9.
Figure 9:
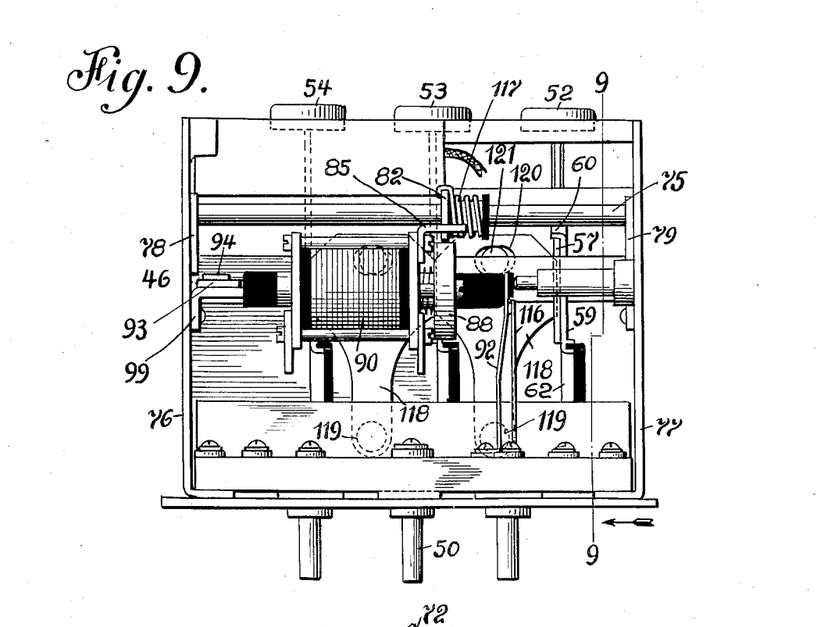
Figure 9 is a rear view of the operating box.

As shown, the operating box 46 is provided with keys 52, 53 and 54, but any number of keys may be employed. Each of these keys is provided with a key lever 55 pivoted on a shaft 56 and each one is provided with an extension 57 which, at its lower and rear end, is provided with a shoulder 58. A bell crank lever 59 provided with a flange 60 extends over the key, there being one such lever for each key. This lever tends to move clockwise as viewed in Figure 8 by means of a spring 61, but this movement is limited by a flange 60 engaging the upper side of the key. Each of these levers 59 is pivoted on a shaft 56 and carries a contact arm 62 provided with contacts 63 and 64. Each of the contact arms 62 is provided with an outstanding lug 65 provided with a flange 66 adapted to be engaged by a nose 67 carried by a lever 68 pivoted on a shaft 69 and normally held in the position shown in Figure 8 by means of a spring 70. The lever 68 is provided with an arm 71 which, when the key is depressed will be engaged by the lower edge of the key lever and rocked downwardly so as to disengage the nose 67 from the flange 66 so that the spring 61 can move the contacts 63 and 64 into engagement with the switch arms 72 and 73, the arm 72 being located directly above the arm 73. When the key is released and is moved to its original position by means of a spring 74, the upper end of the key lever engages the flange 60 rocking the lever counter-clockwise as viewed in Figure 8 and the flange 66 engages the outer surface of the nose 67 depressing the lever 68 against the tension of the spring 70 until the said flange passes beyond the said nose, when the spring 70 raises the lever 68 and projects the nose 67 behind the flange 66 thereby holding the contacts 63 and 64 out of engagement with the switch arms 72 and 73. A cross bar 75 connects the side frames 76 and 77 of the operating box 46. On this cross bar, levers 78 and 79 are pivoted and the opposite ends of these levers are connected by a bar 80 to which one end of the spring 74 is connected. The levers 78 and 79 are also connected by means of a bar 81. Pivoted on the cross bar 75 is a holding lever 82 provided with a tail 83 which underlies the bar 81. The said holding lever is also provided with an extension 84 to limit the downward movement of the said lever by engaging the upper side of the plate 85 which is provided with a slot 86 through which extends a lug 87 carried by the lever 82 which lug normally rests slightly above a plate 88 mounted on a core 89 of a solenoid 90, which core slides horizontally. The core 89 is moved toward the side frame 77 by means of a spring 91 so as to engage a spring contact 92. When the solenoid is energized, the core moves toward the side frame 76 and rocks a lever 93 pivoted on a stud 94, which lever is provided with a tail 95 which engages a slide bar 96 which is provided with slots 97 through which extend guide pins 98 carried by a plate 99, which extends between the side frames 76 and 77. The plate 99 is provided with slots 100 into which extends the extensions 57 of the key levers 55. The slide bar 96 is provided with studs 101, 102 and 103 on which are mounted the locking levers 104, 105 and 106, there being one locking lever for each one of the key levers. A spring 107 extends from a pin 108 carried by the slide bar 96 to a pin 109 carried by a rearwardly extending part of the lever 104 which spring tends to force the end of the lever 104 against the side of the key lever connected to the key 52. If the key 52 is depressed, thereby elevating the rear end 57 thereof, so as to bring the shoulder 58 above the locking lever 104, the spring 107 will move the lever 104 beneath the shoulder 58 and hold the key 52 in a depressed position. For a similar reason, a spring 110 extends from the stud 101 to a pin 111 on a rearwardly extending portion of the locking lever 105 and a spring 112 extends from the stud 102 to a pin 113 carried by a rearwardly extending portion of the lever 106. Stop pins 114 are provided to limit the movement which the said springs can impart to the locking levers. The slide bar 96 is urged toward the tail 95 of the lever 93 by means of a spring 115 connecting the stud 103 to side frame 76. When any one of the keys is depressed, the locking levers 104, 105 or 106 pass beneath the shoulder 58 of the key lever holding the key depressed, while the spring 91 is pushing the core 89 so as to engage the spring contact 92 and place the same against a spring contact 116 thereby closing a circuit. When the solenoid 90 is energized, however, the core is moved so as to rock the lever 93 and move the slide bar 96 towards the side frame 77. The locking levers 104, 105 and 106 tend to rotate on their studs 101, 102 and 103 so that the locking levers will continue to hold the keys depressed. The locking levers engage the stop pins 114 and thereafter the locking levers move with the slide bar which movement carries the locking lever which lies underneath the shoulder 58 of the depressed key out of engagement therewith and the spring 74 pulls outwardly on the bar 80 which underlies the rearward ends of all of the extensions 57 of the key levers thereby returning the key depressed to its elevated position. This movement, however, tensions the spring 117 which is coiled around the shaft 75 and has its ends extending over the bar 81 and the lever 82. The plate 88 is moved towards side frame 76 with the core so that the plate is to one side of the lug 87 carried by the holding lever 82, so that the spring 117 now depresses this lever moving the lug 87 downwardly and locking the core against the action of the spring 89 so that as the current which energizes the solenoid 90 is cut off, the spring 89 cannot move the contact 92 into engagement with the contact 116.

Means are provided to prevent more than one key being depressed at a time, which means consists of a pivoted plate 118 mounted on a stud 119 which plate is provided with a slot 120 which receives a stationary pin 121. The plate 118 lies below and between the adjacent keys. If one key is depressed, the key strikes the upper bevelled surface of the plate 118 and moves the opposite side thereof beneath the next key locking it against depression. There are as many plates 118 as there are spaces between adjacent keys and these plates are so close together that when one of them is moved by a key, it moves all the other plates beneath the keys so that only one key can be depressed.

Figures 5, 14:
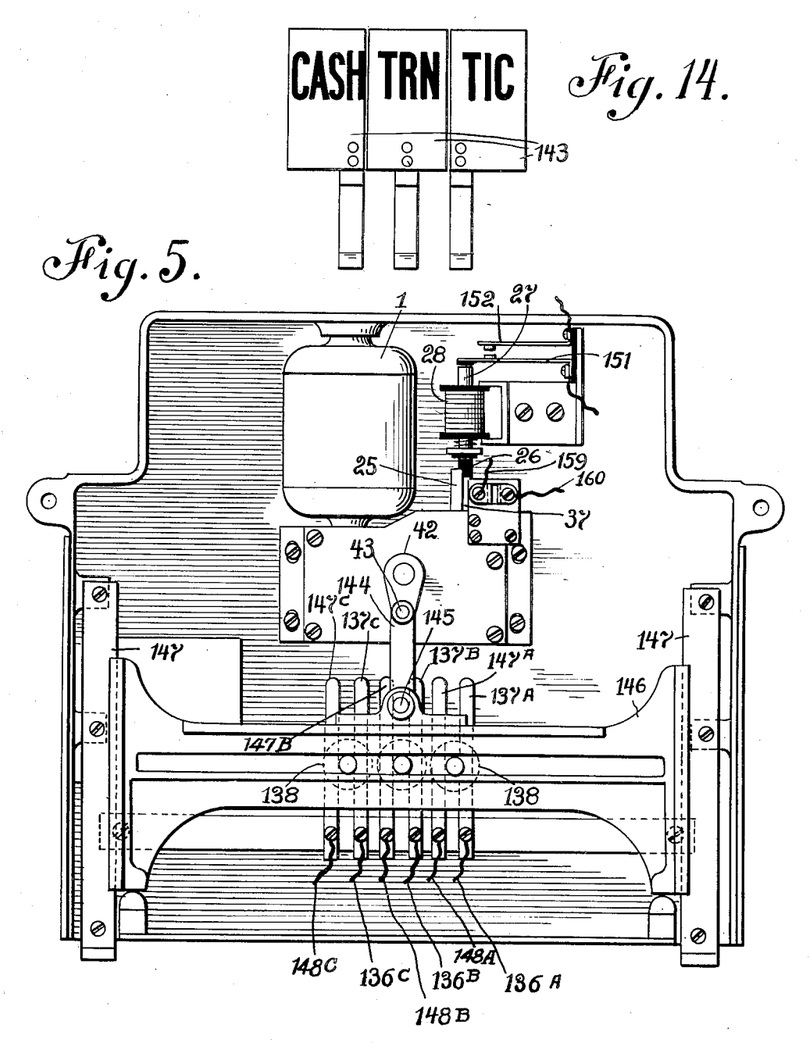
Figure 5 is an elevational view of the gate operating means for the register.
Figure 14 is a view of the indicator targets.
Figure 6:
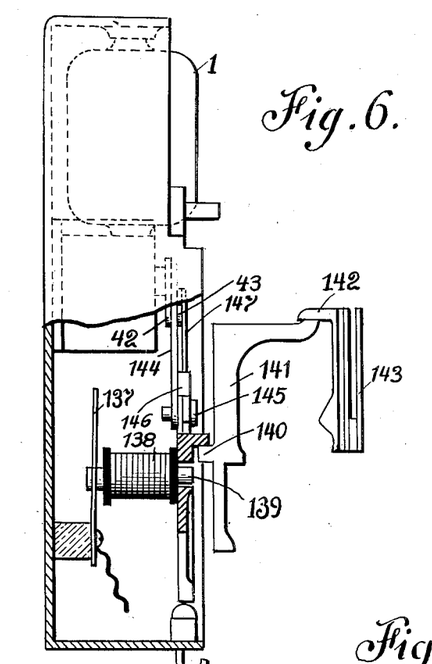
Figure 6 is a side view partly in cross section of the mechanism shown in Figure 5.
Figure 7:
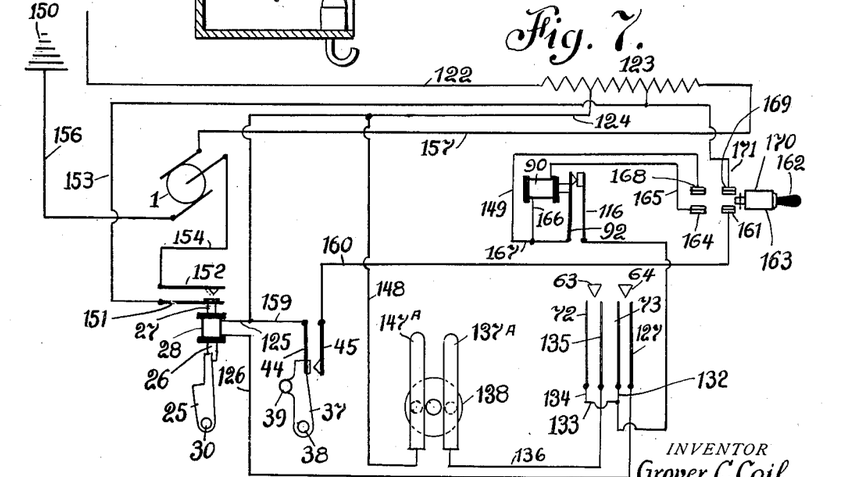
Figure 7 is a diagrammatic view of the various circuits employed.
Figure 10:
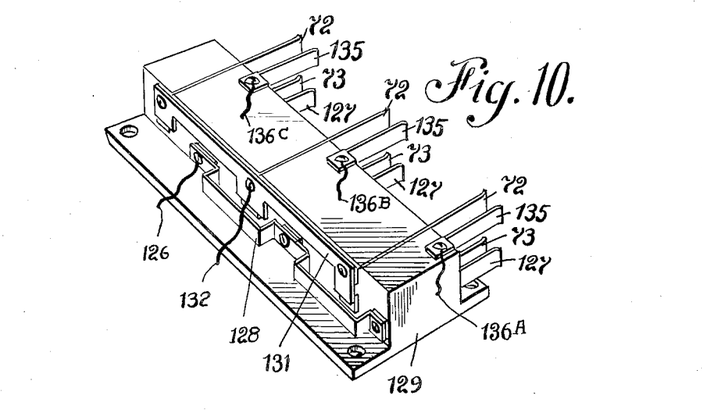
Figure 10 is a perspective view of the switch mechanism which receives the various keys.

Referring to Figure 7, a lead 122 communicates with any suitable source of electric current. If, for instance, the mechanism is used on a street car it would be in communication with the trolley wire. The lead 122 is connected to a resistance unit 123. Connected to a relatively high part of the resistance unit is a lead 124 which communicates with a lead 125 which communicates with the windings of the solenoid 28 (Figures 7 and 11) and a lead 126 extends from the said solenoid to the spring contact 127 (Figures 7 and 10). There are as a matter of fact, as many spring contacts 127 as there are keys and all of these spring contacts are connected together by means of a tie bar 128. The spring contacts 127 extend through an insulated base 129. When the key is depressed, the contact 64 (Figures 7 and 8) connects the spring contact 127 with the spring contact 73. There are as many spring contacts 73 as there are keys but since only one key can be depressed at a time, only one set of the spring contacts 127 and 73 can at any time be connected. All of the spring contacts 73 extend through the base 129 and communicate with a tie bar 131 from which a lead 132 extends. As shown in the diagrammatic figure in Figure 7, a lead 148 communicates with a spring arm 147A, forming a spring contact for the solenoid 138. As a matter of fact, there are as many such leads, spring contacts, and solenoids as there are keys, but in the diagrammatic figure shown in Figure 7, I have illustrated only one key. The spring arms of the other contacts are designated 147B and 147C. Spring contacts 137A, 137B and 137C are likewise connected to the said solenoids and leads 136A, 136B and 136C, all of which I have designated by the reference character 136 in the diagrammatic figure shown in Figure 7, extending to the spring contacts 135 of their respective keys, which contacts are connected by the contact 63 with a spring arm 72, which communicates with a tie bar 131 which is connected to the lead 132 by means of the leads 133 and 134. If any one of the keys is depressed, it simultaneously brings both of the contacts 63 and 64 into engagement with their respective spring contacts, thereby connecting the spring contacts 127 and 73 and the spring contacts 135 and 72. When the current energizes the solenoid 138, it projects the core 139 to the right as shown in Figure 6 and beneath a lip 140 carried by a bar 141 which rests beneath a plate 142 which, as shown in the said Patent, 905,218, forms an operating means to raise a target 143 and to register the transaction. The bar 141 is lifted when the motor operates. For each time the machine is operated, the crank arm 42 makes one revolution as heretofore described. As shown in Figure 5, the crank pin 43 is connected to a pitman 144 which is connected to a pin 145 secured to the gate 146 which slides on track ways 147. This gate is raised and lowered each time the machine is operated. It is, therefore, apparent that the core of that solenoid corresponding to the key depressed is projected beneath the lip 140 and raises the bar 141 corresponding to the key depressed and thereby elevates the target 143 corresponding to the key depressed, while the bars 141 which do not correspond to the keys depressed are not actuated.

When the single solenoid 28 is energized, as heretofore described, its core 27 is elevated thereby moving the spring contact 151 into engagement with the spring contact 152. A lead 153 extends from a part of the resistance unit 123 whereby a moderate voltage would be consumed. The lead 153 extends to the spring contact 151 and if the solenoid 28 is energized so as to move the spring contact 151 so as to engage the spring contact 152, the lead 153 communicates with the lead 154 connected to the field windings of the motor, and a lead 156 extends from the motor to the ground 150. A lead 157 extends from the lowest voltage part of the resistance unit to the motor. It is, therefore, obvious when the solenoid 28 is energized, the motor is operated, but as heretofore described, the motor is cut off after the machine makes one operation. It will be remembered that the lever 25 moves from beneath the core 27 after the shaft has made one complete revolution, and the spring 158 (Figure 11) moves the solenoid 27 downwardly thereby releasing the spring contact 151 from the spring contact 152 so that the circuit is broken and no further current is supplied to the motor, but the motor, as is heretofore described, is allowed to spin before it comes to a rest. It will be remembered, however, that this spinning of the motor after the operation is completed does not rotate the shaft 5 and does not elevate the bar 141.

The lead 124 is also connected to a lead 159 which communicates with the spring contact 44 (Figures 7 and 11). After the operating shaft 5 has made one-half revolution, it will be recalled that the lever 37 moves the spring contact 44 into engagement with the spring contact 45 which communicates with a lead 160 which is connected to a terminal 161 of a switch 162. One arm 163 of the switch when closed connects the terminal 161 to the terminal 164 from which a lead 165 extends to the solenoid 90 and the lead 166 extends from the said solenoid to a lead 167 which is connected to a lead 149 connected to a terminal 168. The terminal 168 is connected with the terminal 169 when the switch is closed by an arm 170. A lead 171 extends from the terminal 169 to the lead 153. When the solenoid 90 is operated, its core is retracted from the spring contact 92 so that it is not in engagement with the spring contact 116, which latter contact is connected to the lead 132 by means of the lead 172.

When the machine is being operated, a slight current is passing through the lead 157 to the field windings of the motor. The spring contacts 151 and 152 are open as are the spring contacts 44 and 45. Spring contacts 92 and 116 are in engagement with each other and are so held by means of a spring 91. The only current being used, therefore, is the very slight current to keep the electro-magnets of the motor magnetized. The moment a key is depressed, the solenoid 28 is energized closing the contact 151 and 152 so that the motor can operate. The contacts 44 and 45, as well as the contacts 92 and 116, remain as they were when the machine was not being operated. When the disk 8 completes one-half of its revolution, the lever 37 engages the spring contact 44 with the spring contact 45 so that the current which passes through the lead 124 continues to energize the solenoid 28, and also passes through the leads 159, 160, switch arm 163 and lead 165 to the solenoid 90, withdrawing the core so as to break the contact between the contacts 92 and 116 and from thence it passes to the ground through the lead 166 and the leads communicating therewith.

From an operating standpoint, the moment any key is pressed, the solenoid 28 causes the motor to be placed in circuit and causes the core of the selected solenoid 138 to be projected beneath the lip 140 of the bar 141. The motor now raises the gate 146. The depressed key is locked in its lower position. When the driving shaft 5 has made one-half revolution, the spring contacts 44 and 45 are closed, thereby breaking the contacts 92 and 116, deenergizing the solenoids 28 and 138, and at the same time moving the lever 93 so as to release the key which is depressed. However, the lower end of the core 27 of the solenoid 28 is engaged by the upper end of the lever 25 thereby holding the contact 151 in engagement with the contact 152 so that the motor continues to operate. When the main driving shaft 5 has completed one revolution, the cam 32 engages the extension 31 of the lever 25 and removes the said lever from beneath the core 27 of the solenoid 28, thereby breaking the motor circuit. At the same time, the roller 39 carried by the lever 37 passes into the notch 35 and the spring 40 moves the lever 37 to the left as viewed in Figures 7 and 11, so that the spring contact 44 becomes disengaged from the spring contact 45 so that the solenoid 28 can receive current and the spring 91 causes the contact 92 to again engage the contact 116. All of the parts are again in their normal position and no current is being used other than the small amount necessary to keep the electro-magnets magnetized. If the machine will not be used for some length of time, the switch 162 can be opened.

I realize that many changes may be made in the specific form of the invention as shown in this application, without departing from the spirit thereof. I now, therefore, desire to claim the same broadly except as I may limit myself in the annexed claims.

Having now described my invention, I claim:

1. In combination, a motor, a register, a reciprocatable gate actuated by said motor, a plurality of solenoids carried by said gate, and selective means by which any one of the said solenoids may be actuated to connect the gate to the said register.

2. In combination, a motor, a gate reciprocated thereby, a plurality of solenoids carried by said gate, a register, a plurality of bars forming the operating means for said register and means whereby any one of said solenoids may be actuated to impart the movement of said gate to the bar corresponding to the solenoid actuated.

3. In a register, a motor circuit normally open, a solenoid controlling said circuit, a gate, a motor to actuate said gate, means whereby the register is operated by the gate, means whereby said motor is operated and a means to deenergize said solenoid when said motor has made only about one-half of its operative movement and means to maintain the motor circuit closed for an interval after the solenoid is de-energized.

4. In a register, a plurality of keys, a gate, a motor whereby the gate is actuated, a plurality of selective solenoids carried by the gate, means whereby when any one of the said keys is operated the motor is actuated and one solenoid corresponding to the operated key is actuated, and means whereby the selected solenoid actuates the register.

5. In a register, a gate, means whereby said gate is operated, a plurality of solenoids carried by said gate, means whereby one of said solenoids is selected and operated each time said gate is operated, and means whereby the selected solenoid operates said register.

6. In a register, a gate, a plurality of keys, a motor whereby said gate is operated, a plurality of solenoids carried by said gate, means whereby when any one of said keys is depressed the motor is operated and one of the solenoids corresponding to the actuated key is operated, and means whereby the selected solenoid when being moved by the gate actuates the register.

7. In a register, a plurality of keys, a motor, a selective mechanism including a plurality of solenoids, there being one solenoid for each key, a gate carrying said solenoids, means whereby when any one of said keys is operated the motor is actuated to drive said gate, means whereby the selective mechanism is controlled, and means whereby the motor is cut off after the gate and solenoid have been operated to actuate the register.

8. In a register, a plurality of keys, a gate, a plurality of selective solenoids carried thereby, there being one solenoid for each key, a motor whereby the gate may be operated to actuate the register, means whereby when any one of said keys is actuated the solenoid corresponding to the operated key is actuated, and means whereby the motor is cut off and the solenoid de-energized when the register has been operated.

9. In combination, a motor, a register, a gate, a plurality of selective solenoids carried by said gate, means whereby a selected one of said solenoids is actuated, means whereby said gate is actuated by said motor to actuate the register through the actuated solenoid, and a means to cut off the motor after the register has been actuated.

GROVER CLEVELAND COIL.